United States Patent [19]
Montgomery

[11] 3,985,061
[45] Oct. 12, 1976

[54] SLEEVE BEARING FOR SUPPORTING RECIPROCATING MEMBERS
[75] Inventor: Robert S. Montgomery, Schenectady, N.Y.
[73] Assignee: The United States of America, Washington, D.C.
[22] Filed: May 21, 1975
[21] Appl. No.: 579,659

[52] U.S. Cl. .................................. 89/43 R; 308/5 R
[51] Int. Cl.². ......................................... F41F 19/02
[58] Field of Search.............. 89/43 R; 308/3.5, 4 R, 308/5 R

[56] References Cited
UNITED STATES PATENTS
2,715,856    8/1955    Kramer et al. ..................... 89/43 R
2,776,173    1/1957    Rudy .................................. 308/5 R Primary Examiner—Stephen C. Bentley
Attorney, Agent, or Firm—Nathan Edelberg; Robert P. Gibson; Harold H. Card, Jr.

[57] ABSTRACT

In bearings of sleeve configuration disposed in adjacent contact with a supply of oil for concentrically supporting a longitudinally reciprocal shaft, excessive wear of the bearings is minimized by providing an adequate oil film between the contact surface of the bearing and shaft through the inclusion of an extremely shallow pocket located within the interior surface of the bearing in the area against which maximum loading is anticipated and extending axially from one end of the contact surface for a distance from one-half to three-quarters of the total surface length.

7 Claims, 5 Drawing Figures

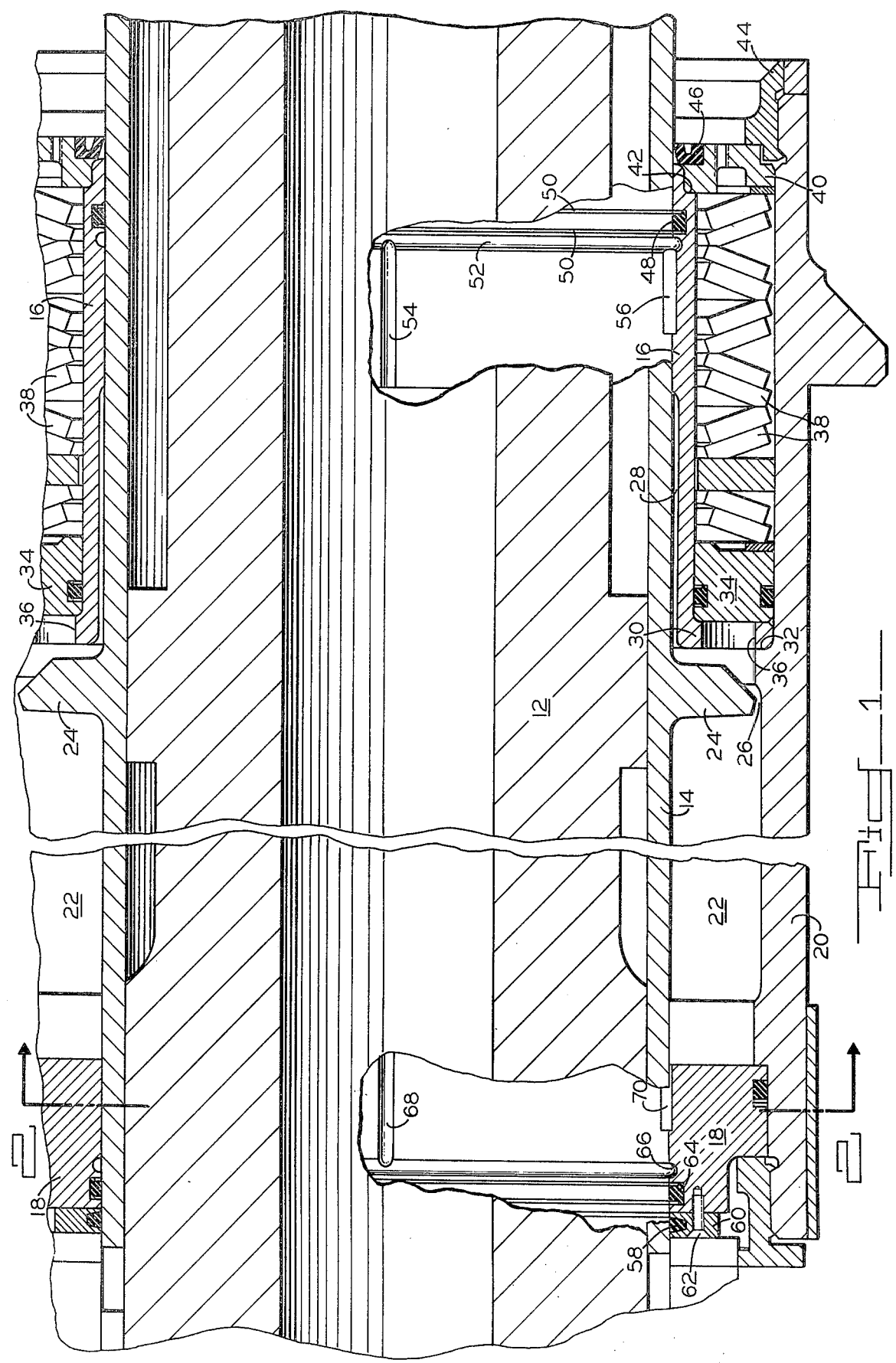

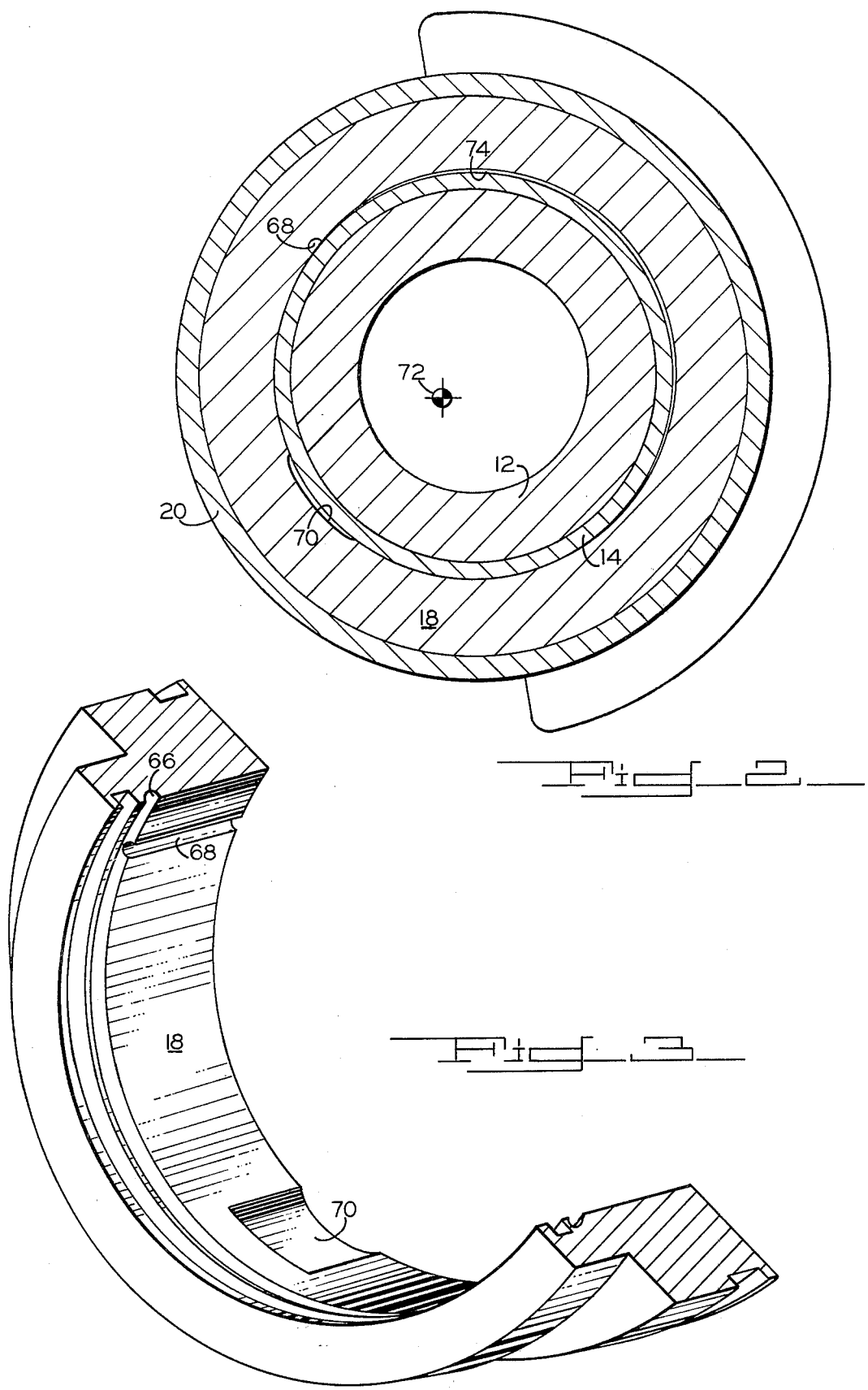

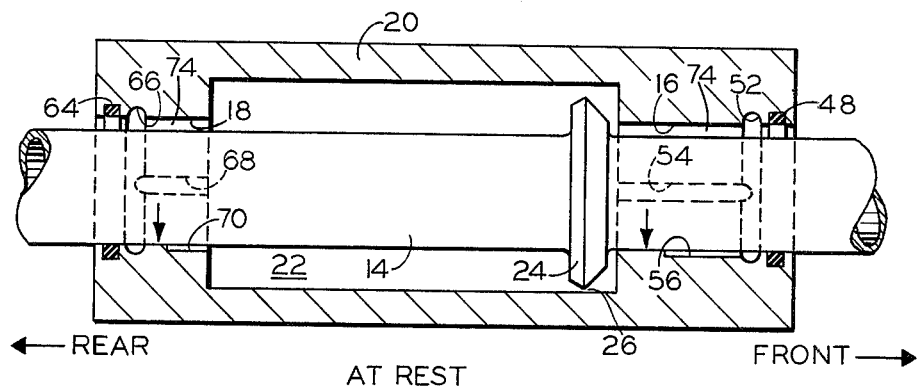
Fig. 4 — AT REST
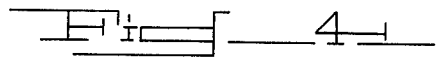
Fig. 5 — IN RECOIL

3,985,061

SLEEVE BEARING FOR SUPPORTING RECIPROCATING MEMBERS

The invention described herein may be manufactured, used, and licensed by or for the Government for Governmental purposes without the payment to me of any royalties thereon.

BACKGROUND OF THE INVENTION

This invention relates to support bearings for elongated members subjected to axial reciprocation and is more particularly directed to the provision and maintenance of an effective hydrodynamic lubricant film between the bearing and the reciprocating member.

In mechanisms wherein one or more cylindrical bearings are utilized to concentrically support an elongated member for axial reciprocation, it is essential that the interior geometry of the bearings facilitate the initial formation and subsequent continuance of a lubricant film therein of sufficient thickness to withstand the loading imparted thereto throughout the entire reciprocation of the supported member. Such requirement is particularly important in recoil systems for large caliber guns wherein the supported member is a gun tube subjected to extremely high acceleration forces during the initial few milliseconds of recoil. Since the center of gravity of the recoiling mass is often offset from the bore axis of the gun tube, the extremely rapid rise in the acceleration thereof generates a couple which pivots the gun tube into loading contact with the support bearing. During this critical loading period, the flow of the lubricant fluid into each bearing lags well behind the actual velocity of the gun tube so that the quantity thereof drawn into the bearing will, at best, form a "boundary" film, i.e., one with a thickness of one or two molecular dimensions. Experience has shown that a film of such marginal nature will not withstand the peak loading imparted thereto thereby leading to undesirable metal-to-metal contact between the bearing and the gun tube. As a result, the bearings heretofore employed to support large caliber gun tubes are unusually vulnerable to rapid and excessive wear. In many instances, such metal-to-metal bearing contact has actually prevented the gun tube from returning to the proper battery position thereof.

Experience with thrust bearings has demonstrated that certain surface profiles thereon are conductive to the formation and continuance of lubricant films of significantly increased thickness. One such profile includes a plurality of sectorshaped recesses separated by lands provided with a stepped surface, known in the art as a "Rayleigh step," along the leading edge thereof. Another configuration intended to improve the load carrying capacity of a thrust bearing surface consists of a plurality of spiral or herringbone oil-carrying grooves. However, while these surface profiles have met with some success in thrust bearings designed to support a shaft subjected to a steady state type of reciprocal movement, such is not the case in connection with recoil bearings for concentrically supporting a gun tube to which a constantly changing acceleration is applied. Furthermore, it has been found that the incorporation of a "Rayleigh step" in a cylindrical bearing surrounding a sliding shaft acerbates the "side leakage" of the lubricating fluid, i.e., the tendency to flow in a circumferential direction away from the area of maximum loading to the diametrically opposed area of minimum loading. Obviously, such leakage cannot be tolerated especially during the peak loading encountered within the initial portion of recoil.

SUMMARY OF THE INVENTION

It is therefore an object of this invention to improve the endurance life of cylindrical bearings utilized to concentrically support a recoiling gun tube.

It is also an object of this invention to provide a bearing, as aforesaid, which can be loaded more rapidly and to a greater extent than heretofore within a breakdown of the lubricant film between the bearing and the gun tube supported thereby.

A further object of this invention is to provide a bearing, as aforesaid, wherein the interior surface profile thereof is specifically designed to provide an unusually thick lubricant film in contact with the exterior surface of a reciprocating gun tube.

Another object of the present invention resides in the provision of a bearing, as aforesaid, wherein the interior surface profile thereof facilitates the maintenance of an adequate supply of lubricant throughout the entire travel of the gun tube.

A further object of this invention is to provide a bearing, as aforesaid, wherein the interior surface profile thereof is designed to minimize leakage of lubricating fluid past the seals provided at the outboard end thereof.

It has been found that the foregoing objects can best be achieved in connection with the type of front and rear bearings generally employed to support a reciprocating gun tube by including an oil seal within the interior of each bearing at the outboard end thereof and a circumferential channel inwardly of and adjacent to the oil seal. Each bearing is also provided with an interior oil passage originating at the inboard end thereof and extending axially therethrough into communication with the circumferential channel therein. In addition, an extremely shallow pocket, preferably of arcuate contour, originates at the inboard end of the rear bearing and extends rearwardly into the interior thereof along an axis displaced from the oil passage by about 90° and for a distance approximately equal to half the load-carrying length of the bearing. The front bearing is provided with an identical pocket except that the open end thereof originates at the circumferential channel rather than at the inboard end of the bearing. Both bearings are circumferentially oriented relative to the vertical axis of the gun tube such that the pockets are located below but sufficiently offset from the vertical to lie in the path of the central axis passing through the center of gravity of the recoiling mass.

Thus, as the gun tube begins to recoil, the oil in the shallow pockets is drawn rearwardly therefrom to form a lubricant film between the gun tube and the bearing surfaces capable of withstanding the initial peak loading thereon. The interior surface profile of the bearings is additionally designed to provide a continuous replenishment of the lubricant film for withstanding the subsequent loading thereon during the remaining reciprocation of the gun tube. As oil is squeezed out from between the gun tube and the bearings under the loading imparted thereto, such oil flows into the axial passages through the bearings. During the recoil of the gun tube, the oil accumulating in the passage in the rear bearing is drawn into the circumferential channel which then serves as a reservoir for the formation of the lubricant film required at the start of counterrecoil.

Conversely, the oil accumulating in the passage in the front bearing is drawn into the circumferential channel thereof during counterrecoil which then serves as a reservoir for the formation of the lubricant film required at the start of recoil. In addition to the reservoir function of the circumferential channels, the communication thereof with the oil passages in the bearings substantially reduces the pressure on the oil seals and thereby virtually eliminates the leakage heretofore encountered with bearings of conventional configuration.

BRIEF DESCRIPTION OF THE DRAWINGS

The exact nature of the invention as well as other objects and advantages thereof will be readily apparent from consideration of the following specification relating to the annexed drawings, wherein:

FIG. 1 is a vertical section through a longitudinal portion of the gun tube and surrounding recoil assembly prior to recoil thereof with the upper half thereof being partially broken away and being additionally broken away in the vicinity of the front and rear bearings to show the internal configuration thereof;

FIG. 2 is a full vertical section taken along line 2—2 in FIG. 1 but showing the relationship between the rear bearing and the gun tube during the peak loading incurred during the initial portion of recoil;

FIG. 3 is an enlarged isometric view of the rear bearing broken in half to show the internal configuration thereof.

FIG. 4 is a schematic view showing the position of the gun tube relative to the front and rear bearings immediately prior to the start of recoil; and FIG. 5 is a similar schematic view showing the position of the gun tube during recoil at the instant deceleration thereof begins.

DESCRIPTION OF A PREFERRED EMBODIMENT

The horizontal support of relatively long shafts subjected to slidable longitudinal movement is best accomplished by spaced apart concentric sleeve bearings. Ordinarily, the proper lubrication of these bearings is a relatively simple matter since the longitudinal movements of the shaft involve a fairly low level of initial acceleration resulting in correspondingly low inertial loads. However, where the shaft is in the form of a large caliber gun tube 12 such as that utilized in the 152mm Gun Launcher for the M551 Sheridan Vehicle, the extremely rapid initial acceleration thereof from a position of rest, approximately 70 feet per second in just 2½ milliseconds, results in a bearing load of 144,000 pounds by the time the gun tube has recoiled for 7 milliseconds. As a result, the lubrication of the bearings utilized to support tube 12 has been of marginal value in preventing the type of metal-to-metal contact which causes rapid wear of the bearing surfaces and in some instances has led to a failure of gun tube 12 to return to the battery position thereof.

As best shown in FIG. 1, gun tube 12 is provided with a sleeve 14 fixed to the exterior thereof and of sufficient length to remain in continuous sliding contact with the interior surfaces of a front and a rear support bearing 16 and 18 respectively, which are, in turn, retained in longitudinally spaced arrangement in a cylindrical housing 20 secured at the rear end thereof to gun mount structure (not shown). The space between bearings 16 and 18 serves as a reservoir 22 for a pressurized hydraulic oil of lubricating quality. An annular rib 24 projects outwardly from the central portion of sleeve 14 and cooperates with the interior of housing 20 to provide a restricted passage 26 therebetween such that the flow of hydraulic fluid therethrough during the recoil and counterrecoil of gun tube 12 is suitably throttled to produce a decelerating force thereagainst.

The inboard half of front bearing 16 is internally counterbored, as indicated at 28, so that only the outboard half thereof is in concentric supporting contact with the exterior of sleeve 14 on gun tube 12. A circular flange 30 projects from the rear end of bearing 16 to seat against an annular shoulder 32 in cylindrical housing 20 and provide a stop surface for a longitudinally slidable ring-shaped piston 34 surrounding bearing 16. During the recoil travel of gun tube 12, the throttled flow of hydraulic fluid past rib 24 on gun tube sleeve 14 is directed against the rear face of piston 34 through a plurality of holes 36 radially spaced about flange 30. The forward movement thereby imparted to piston 34 compresses a plurality of spring washers 38 surrounding bearing 16 to store the energy required to return gun tube 12 to the battery position thereof during counterrecoil. Spring washers 38 are retained in assembled juxtaposition by a cap ring 40 seated against an annular shoulder 42 at the front end of bearing 16 and held in place by a suitable retainer ring 44 secured within the interior of housing 20.

Cap ring 40 is provided with a flexible lip seal 46 in wiping contact with the exterior surface of gun tube sleeve 14 immediately adjacent the front end of bearing 16. Slightly to the rear of shoulder 42, the interior surface of bearing 16 is suitably grooved to seat a T-shaped seal 48 of a suitable elastomeric material sandwiched between back-up rings 50 of a relatively soft metal such as bronze. A channel 52 is circumferentially formed about the interior of bearing 16 rearwardly adjacent seal 48 and is intersected by an oil passage 54 which extends axially forward from the rear or inboard end of bearing 16. Passage 54 may be in any form suitable for maximum ease of manufacture, such as the semi-cylindrical groove best shown in FIG. 1, or even a full hole drilled through the body portion of bearing 16.

An extremely shallow pocket 56, on the order of 0.5 to 0.8 mils at the deepest point thereof, is ground into the interior of bearing 16 parallel to oil passage 54 along an axis displaced therefrom by about 90°. Pocket 56 originates at channel 52 and extends axially into the interior of bearing 16 for a distance between one-half and three-quarters of the remaining length thereof. The width of pocket 56 will vary in accordance with the diameter of tube 12 as well as with the extent of the actual circumferential contact between bearing 16 and sleeve 14 on gun tube 12 under the maximum load imparted thereto. Since the function of pocket 56 is to accumulate sufficient oil to initiate and maintain a lubricant film of optimum thickness, consistent with the viscosity thereof, it would appear that the width of pocket 56 should be maximized. On the other hand, if pocket 56 is too wide, the oil may be forced past the opposite sides thereof too rapidly to provide the degree of accumulation required. Furthermore, the bearing surface area available to carry the loading applied thereto without incurring excessive wear during the first few milliseconds of recoil travel of gun tube 12 is critically dependent on the width of pocket 56. The proper selection between these two extremes of width is, of course, dependent on the degree of diametrical tolerance incorporated in sleeve 14 and bearing 16 during the manufacture thereof.

Although rear bearing 18 is considerably shorter than front bearing 16, it is similarly retained in the rear end portion of cylindrical housing 20. However, the wiper seal for contacting the exterior surface of sleeve 14 of gun tube 12 is a flexible ring 58 of solid elastomeric material centrally seated in the interior periphery of a mounting ring 60 of larger diameter which is, in turn, secured to the rear face of bearing 18 by a plurality of radially spaced screws 62. The interior surface of bearing 18 is also provided with an oil seal 64 at the outboard end thereof and an adjacent circumferential channel 66 in communication with an axial oil passage 68. In addition, a shallow pocket 70, identical in configuration to pocket 56 in front bearing 16, is formed in the interior surface of rear bearing 18 in the same 90° relationship to oil passage 68 therein. However, instead of intersecting channel 66 as in front bearing 16, pocket 70 originates at the inboard end of rear bearing 18 and extends rearwardly therein toward channel 66 for a distance between one-half to three-quarters of the bearing length.

Cylindrical housing 20 is assembled on gun tube 12 such that bearings 16 and 18 are oriented to position pockets 56 and 70 therein in the locations which will insure the formation of lubricant films during the initial portion of recoil. Since, as best seen in FIG. 2, the center of gravity 72 of the recoiling mass, i.e., the gun tube 12 and the various components secured thereto, is, in this type of gun, often offset below and to the left of the vertical bore axis of gun tube 12, as seen looking toward the muzzle end thereof, the recoiling forces generate a couple, shown by arrows $F_1$ and $F_2$ in FIG. 5, which initially pivots gun tube 12 in a counterclockwise direction. Accordingly, in order to withstand the peak loading incurred during the initial portion of recoil, bearings 16 and 18 should theoretically be oriented so that pockets 56 and 70 face in opposite directions in line with the particular diameter of gun tube 12 which passes through the center of gravity 72 of the recoiling mass. However, for a purpose to be hereinafter explained, front bearing 16 is actually oriented so that pocket 56 therein is located in the same longitudinal axis as pocket 70. Since oil passages 54 and 68 are offset from respective pockets 56 and 70 by an angle of 90°, such passages will be located in an area to which little or no load is transmitted. Thus, although the bottom portions of channels 52 and 66 together with pockets 56 and 70 contain an accumulation of oil, the initial contact surfaces (FIG. 4) between the underside of gun tube sleeve 14 and bearings 16 and 18 are protected by no more than a "boundary" lubricant film, i.e., from one to two molecular dimensions. When gun tube 12 is at rest, the weight thereof produces a clearance 74 between the upper surface of sleeve 14 and bearings 16 and 18.

However, at the beginning of recoil, the oil in pocket 56 is drawn rearwardly to form a film between the contacting surfaces of front bearings 16 and gun tube sleeve 14. Even though the velocity of this oil is but half that of gun tube 12, it is, nevertheless sufficient to exert a lifting pressure thereagainst which minimizes the period of contact thereof with bearing 16. As gun tube 12 tilts in a counterclockwise direction in response to the couple produced by the recoil forces, the oil in channel 52 is drawn into clearance 74 to form a lubricant film between the upper exterior of sleeve 14 and the corresponding interior surface of front bearing 16 for resisting the forces produced by the upward tilting of gun tube 12 throughout the acceleration phase thereof. Thus, once gun tube 12 begins to decelerate, the reversal of the direction in which the couple is applied results in a downward tilting of gun tube 12 throughout the remaining recoil travel thereof. During this period, the lubricant film initially formed between sleeve 14 and the corresponding lower interior surface of bearing 16 during the acceleration phase of gun tube 12 is constantly replenished by the oil being drawn from pocket 56 by the recoiling gun tube 12. As oil is squeezed out from between bearing 16 and sleeve 14 by the loading applied thereto, it flows into oil passage 54 to return to channel 52 for replenishment of pocket 56.

While rear bearing 18 is similarly lubricated during the deceleration phase of gun tube 12, a different environment exists at the beginning of recoil where counterclockwise tilting of gun tube 12 does not permit the formation of a lubricant film in the contact area located between channel 66 and pocket 70 as rapidly as in front bearing 16. However, in view of the extremely rapid acceleration of gun tube 12, the period during which rear bearing 18 is in "metal-to-metal" contact with sleeve 14 is too brief to produce any significant wear. Once gun tube 12 begins to decelerate, the oil then drawn from pocket 70 will be sufficient to form a lubricant film equivalent to that provided in front bearing 16. In guns of larger caliber, however, it may be necessary to provide a plurality of adjacent parallel pockets 70 to obtain the required thickness of the lubricant film without reducing the load carrying surface of bearing 18 to an unacceptable extent. During the recoil of gun tube 12, the oil in pocket 70 is continuously replenished from reservoir 22 while during counterrecoil such replenishment is provided by channel 66. Thus, the thickness of the lubricant film during the concluding portion of the counterrecoil travel of gun tube 12 is capable of resisting the increased loading produced thereagainst as the couple is reversed by the deceleration effected at that time.

Accordingly, there is here provided a superior sleeve bearing which is particularly valuable for supporting a large caliber gun tube during recoil and counterrecoil. The incorporation of one or more axial oil pockets in the interior surface of this bearing ensures the formation of a lubricant film of sufficient thickness to prevent the rapid and excessive wear usually produced by the extremely high loading encountered during the initial recoil travel of the gun tube. In addition, the provision of a circumferential channel in the interior surface of the bearing adjacent the oil seal in the outboard end thereof prevents the build-up of pressure which invariably results in excessive leakage of oil past the seal. Furthermore, the entry of oil into the pockets is facilitated by the provision of an axial oil passage in communication with the circumferential channel at a location within the interior of the bearing which receives little or no loading.

The foregoing disclosure and description of the invention is illustrative only. Various changes may be made within the scope of the appended claims without departing from the spirit of the invention.

1. In an assembly having an elongated cylindrical member disposed for reciprocal passage through a supply of hydraulic oil, means for concentrically supporting the cylindrical member, comprising, at least one fixedly mounted hollow bearing surrounding the cylindrical member in adjacent contact with the supply of oil,
a sealing ring seated within said bearing at the end thereof remote from the oil supply,
said bearing having
a circumferential channel therein located inwardly of said sealing ring,
an oil passage extending axially between said channel and the supply of oil, and
an extremely shallow oil pocket extending axially therein for a distance between one-half and three-quarters of the length between said channel and the end of said bearing remote therefrom,
said bearing being angularly oriented relative to the reciprocating member to locate said oil pocket in the area against which maximum loading by the cylindrical member is anticipated.

2. In an assembly having an elongated shaft disposed for reciprocal message through a surrounding reservoir of oil, fixed means for slidably supporting the shaft, comprising,
a pair of hollow bearings concentrically surrounding the shaft in straddling contact with the oil reservoir,
a sealing ring seated within each of said bearings at the ends thereof remote from the oil reservoir,
each of said bearings having a circumferential channel therein located inwardly of said sealing ring and an axial oil passage extending from said channel into communication with the oil reservoir,
one of said bearings having an extremely shallow pocket extending axially inward from said channel for a distance from one-half to three-quarters of the remaining length to the oil reservoir, said pocket being parallel to said oil passage but offset therefrom by an angle of 90°,
the other of said bearings having a similar pocket extending inwardly toward said channel from the end in contact with the oil reservoir, and
said bearings being oriented relative to the vertical axis of the shaft to locate said oil pockets in the same longitudinal axis and substantially midway of the surface contact area between said bearings and the shaft during the reciprocation thereof whereby the oil squeezed out from between the contact surfaces of the gun tube and said bearings flows into said oil passages for entry into said circumferential channels.

3. In a gun having a cylindrical recoil housing containing a reservoir of hydraulic oil under pressure, a gun tube slidably mounted in said recoil mechanism for recoil and counterrecoil movement through the oil reservoir, means for throttling the hydraulic oil during recoil and counterrecoil of the gun tube to reduce the velocity thereof, and means fixed in the recoil housing for slidably supporting the gun tube, comprising,
a forward and rearward bearing concentrically surrounding the gun tube in adjacent contact with the respective opposite ends of the oil reservoir,
a sealing ring seated within each of said bearings in proximate relation to the outboard ends thereof,
each of said bearings having a circumferential channel therein located inwardly of said sealing ring and an axial oil passage extending from said channel into communication with the oil reservoir,
said forward bearing having an extremely shallow pocket communicating with said channel and extending axially inward therefrom for a distance from one-half to three-quarters of the remaining length to the oil reservoir,
said rearward bearing having a similar pocket extending inwardly therein toward said channel for a corresponding relative distance, and
said bearings being oriented relative to the vertical axis of the gun tube to locate said pockets in axial alignment substantially midway of the surface contact area between said bearings and gun tube during the reciprocation thereof.

4. The bearing support means defined in claim 3 wherein said pockets vary between 0.5 and 0.8 mils at the deepest point thereof and wherein the width thereof varies in direct relation to the gun tube diameter as well as to the degree of diametrical clearance between the gun tube and said bearings.

5. The bearing support means defined in claim 3 wherein said oil passages in said bearings are coincident with the interior surfaces thereof and extend therealong parallel to said pockets but offset therefrom by an angle of 90°.

6. The bearing support means defined in claim 5 wherein the center of gravity of the gun tube is offset from the central axis thereof and said bearings are oriented to bring said pockets into position to oppose the maximum loading imparted to the gun tube through the center of gravity thereof while at the same time positioning said oil passages in the area of minimum loading.

7. The bearing support means defined in claim 6 wherein the weight of the gun tube and the difference between the corresponding diameters of the gun tube and each of said bearings results in clearances at the upper portions thereof prior to the recoil of the gun tube and wherein the location of the center of gravity produces a couple which acts during the acceleration portion of recoil to pivot the exterior surface of the gun tube out of contact with said pocket in said forward bearing and simultaneously increase the loading on the surface area surrounding said pocket in said rearward bearing whereby the initial oil film therein minimizes any metal-to-metal contact with the gun tube and whereby said pockets in both of said bearings continue to accumulate sufficient oil to provide the film thickness necessary to prevent the recurrence of metal-to-metal contact during the remaining reciprocation of the gun tube.

* * * * *